(12) United States Patent
Frederiksen et al.

(10) Patent No.: US 11,082,902 B2
(45) Date of Patent: Aug. 3, 2021

(54) METHOD AND APPARATUS FOR ENABLING A USER EQUIPMENT TO USE CELLS HAVING DIFFERENT FREQUENCIES

(71) Applicant: Nokia Solutions and Networks Oy, Espoo (FI)

(72) Inventors: Frank Frederiksen, Klarup (DK); Troels Emil Kolding, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 494 days.

(21) Appl. No.: 14/429,873

(22) PCT Filed: Sep. 21, 2012

(86) PCT No.: PCT/EP2012/068647
§ 371 (c)(1),
(2) Date: Mar. 20, 2015

(87) PCT Pub. No.: WO2014/044320
PCT Pub. Date: Mar. 27, 2014

(65) Prior Publication Data
US 2015/0257065 A1   Sep. 10, 2015

(51) Int. Cl.
*H04W 36/06* (2009.01)
*H04W 16/32* (2009.01)
(Continued)

(52) U.S. Cl.
CPC ............ *H04W 36/06* (2013.01); *H04L 5/001* (2013.01); *H04L 5/0041* (2013.01);
(Continued)

(58) Field of Classification Search
CPC ... H04L 25/0224; H04L 5/001; H04L 5/0041; H04W 36/04; H04W 36/06; H04W 36/20; H04W 36/26; H04W 36/38; H04W 52/0206; H04W 52/0229; H04W 72/04; H04W 76/02; H04W 84/045
(Continued)

(56) References Cited

U.S. PATENT DOCUMENTS

2011/0300807 A1* 12/2011 Kwun ................... H04W 24/10
                                                               455/63.1
2012/0115485 A1*  5/2012 Narasimha ............ H04W 68/02
                                                               455/437
(Continued)

FOREIGN PATENT DOCUMENTS

WO     WO 2011/038150 A1    3/2011

OTHER PUBLICATIONS

3GPP TSG-RAN WG2#67, Aug. 24-28, 2009, Shenzhen, China, R2-094808, "[66b#6] UMTS-LTE: Hybrid cells", Qualcomm, 14 pgs.
(Continued)

*Primary Examiner* — Huy D Vu
*Assistant Examiner* — Nizam U Ahmed
(74) *Attorney, Agent, or Firm* — Harrington & Smith (57) ABSTRACT

A method including determining that a user equipment on a first cell having a first frequency is to alternatively or additionally use a second cell having a second different frequency; and searching for a reference signal of said second cell within a window defined with respect to said first cell or a third cell.

16 Claims, 5 Drawing Sheets

(51) Int. Cl.
*H04L 25/02* (2006.01)
*H04L 5/00* (2006.01)
*H04W 36/38* (2009.01)
*H04W 52/02* (2009.01)
*H04W 84/04* (2009.01)

(52) U.S. Cl.
CPC ... *H04W 52/0206* (2013.01); *H04W 52/0229* (2013.01); *H04L 25/0224* (2013.01); *H04W 16/32* (2013.01); *H04W 36/38* (2013.01); *H04W 84/045* (2013.01); *Y02D 30/70* (2020.08)

(58) Field of Classification Search
USPC .......................................................... 370/331
See application file for complete search history.

(56) References Cited

U.S. PATENT DOCUMENTS

| | | | | |
|---|---|---|---|---|
| 2012/0307670 | A1* | 12/2012 | Kazmi | H04W 24/10 370/252 |
| 2013/0250881 | A1* | 9/2013 | Liao | H04W 36/08 370/329 |
| 2015/0195824 | A1* | 7/2015 | Choi | H04L 1/0003 370/236 |

OTHER PUBLICATIONS

Sesia, Stefania, et al., "LTE—The UMTS Long Term Evolution: From Theory to Practice", © 2011 John Wiley & Sons Ltd., 8 pgs.

* cited by examiner

METHOD AND APPARATUS FOR ENABLING A USER EQUIPMENT TO USE CELLS HAVING DIFFERENT FREQUENCIES

Some embodiments relate to methods and apparatuses and in particular but not exclusively for enabling a user equipment to use cells or the like having different frequencies.

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how various aspects of communication shall be implemented between communicating devices. A communication can be carried on wired or wireless carriers. In a wireless communication system at least a part of communications between stations occurs over a wireless link.

Examples of wireless systems include public land mobile networks (PLMN) such as cellular networks, satellite based communication systems and different wireless local networks, for example wireless local area networks (WLAN). A wireless system can be divided into cells or other radio coverage or service areas. A radio service area is provided by a station. Radio service areas can overlap, and thus a communication device in an area can typically send signals to and receive signals from more than one station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station and/or another user equipment. The communication device may access a carrier provided by a station, for example a base station, and transmit and/or receive communications on the carrier.

An example of communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A communication system can comprise different types of radio service areas providing transmission/reception points for the users. For example, in LTE-Advanced the transmission/reception points can comprise wide area network nodes such as a macro eNode-B (eNB) which may, for example, provide coverage for an entire cell or similar radio service area. Network nodes can also be small or local radio service area network nodes, for example Home eNBs (HeNB), pico eNodeBs (pico-eNB), or femto nodes. The smaller radio service areas can be located wholly or partially within the larger radio service area. A user equipment may thus be located within, and thus communicate with, more than one radio service area. The nodes of the smaller radio service areas may be configured to support local offload.

There is provided according to a first aspect a method comprising: determining that a user equipment on a first cell having a first frequency is to alternatively or additionally use a second cell having a second different frequency; and searching for a reference signal of said second cell within a window defined with respect to said first cell or a third cell.

A location of said reference may be dependent on a time offset between said first frequency signal of said first cell and a third frequency signal of said third cell.

If said time offset is less than a threshold, said reference signal may have a reference signal offset defined with respect to a later of said first and third frequency signals. If said time offset is greater than a threshold, said reference signal may have a reference signal offset defined with respect to said first frequency signal.

The reference signal offset may be defined with respect to a starting point of one of said first and third frequency signals.

The window may be dependent on said threshold. The window may be twice the size of said threshold.

The first cell and said third cell may comprise macro cells.

The second cell may be smaller than said first cell. The second cell may comprise one of a plurality of second cells overlying said first cell.

The reference signal may comprise information to permit an attachment of said user equipment to said third cell. The reference signal may be coupled to identity information associated with an operator.

There is provided according to a second aspect an apparatus comprising: at least one processor and at least one memory including computer program code the at least one memory and the computer code configured to, with the at least one processor, cause the apparatus at least to perform: determine that a user equipment on a first cell having a first frequency is to alternatively or additionally use a second cell having a second different frequency; and search for a reference signal of said second cell within a window defined with respect to said first cell or a third cell.

A location of said reference may be dependent on a time offset between said first frequency signal of said first cell and a third frequency signal of said third cell.

If said time offset is less than a threshold, said reference signal may have a reference signal offset defined with respect to a later of said first and third frequency signals. If said time offset is greater than a threshold, said reference signal may have a reference signal offset defined with respect to said first frequency signal.

The reference signal offset may be defined with respect to a starting point of one of said first and third frequency signals.

The window may be dependent on said threshold. The window may be twice the size of said threshold.

The first cell and said third cell may comprise macro cells.

The second cell may be smaller than said first cell. The second cell may comprise one of a plurality of second cells overlying said first cell.

The reference signal may comprise information to permit an attachment of said user equipment to said third cell. The reference signal may be coupled to identity information associated with an operator.

There is provided according to a third aspect a method comprising: providing a reference signal for a user equipment on a first frequency in a first cell, said reference signal being provided within a second cell within a window defined with respect to said first cell or a third cell, wherein said reference signal has a second frequency which is different to said first frequency.

A location of said reference may be dependent on a time offset between said first frequency signal of said first cell and a third frequency signal of said third cell.

If said time offset is less than a threshold, said reference signal may have a reference signal offset defined with respect to a later of said first and third frequency signals. If said time offset is greater than a threshold, said reference signal may have a reference signal offset defined with respect to said first frequency signal.

The reference signal offset may be defined with respect to a starting point of one of said first and third frequency signals.

The window may be dependent on said threshold. The window may be twice the size of said threshold.

The first cell and said third cell may comprise macro cells.

The second cell may be smaller than said first cell. The second cell may comprise one of a plurality of second cells overlying said first cell.

The reference signal may comprise information to permit an attachment of said user equipment to said third cell. The reference signal may be coupled to identity information associated with an operator.

There is provided according to a fourth aspect an apparatus comprising: at least one processor and at least one memory including computer program code the at least one memory and the computer code configured to, with the at least one processor, cause the apparatus at least to perform: provide a reference signal for a user equipment on a first frequency in a first cell, said reference signal being provided within a second cell within a window defined with respect to said first cell or a third cell, wherein said reference signal has a second frequency which is different to said first frequency.

A location of said reference may be dependent on a time offset between said first frequency signal of said first cell and a third frequency signal of said third cell.

If said time offset is less than a threshold, said reference signal may have a reference signal offset defined with respect to a later of said first and third frequency signals. If said time offset is greater than a threshold, said reference signal may have a reference signal offset defined with respect to said first frequency signal.

The reference signal offset may be defined with respect to a starting point of one of said first and third frequency signals.

The window may be dependent on said threshold. The window may be twice the size of said threshold.

The first cell and said third cell may comprise macro cells.

The second cell may be smaller than said first cell. The second cell may comprise one of a plurality of second cells overlying said first cell.

The reference signal may comprise information to permit an attachment of said user equipment to said third cell. The reference signal may be coupled to identity information associated with an operator.

At least one method may be performed by a computer program product.

There is provided according to a fifth aspect an apparatus comprising means for determining that a user equipment on a first cell having a first frequency is to alternatively or additionally use a second cell having a second different frequency; and means for searching for a reference signal of said second cell within a window defined with respect to said first cell or a third cell.

A location of said reference may be dependent on a time offset between said first frequency signal of said first cell and a third frequency signal of said third cell.

If said time offset is less than a threshold, said reference signal may have a reference signal offset defined with respect to a later of said first and third frequency signals. If said time offset is greater than a threshold, said reference signal may have a reference signal offset defined with respect to said first frequency signal.

The reference signal offset may be defined with respect to a starting point of one of said first and third frequency signals.

The window may be dependent on said threshold. The window may be twice the size of said threshold.

The first cell and said third cell may comprise macro cells.

The second cell may be smaller than said first cell. The second cell may comprise one of a plurality of second cells overlying said first cell.

The reference signal may comprise information to permit an attachment of said user equipment to said third cell. The reference signal may be coupled to identity information associated with an operator.

Reference will now be made by way of example only to the accompanying Figures in which.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

In a wireless communication system mobile communication devices or user equipments (UE) 102, 103, 105 are provided wireless access via at least one base station or similar wireless transmitting and/or receiving node or point. In the FIG. 1 example two overlapping access systems or radio service areas of a cellular system 100 and 110 and three smaller radio service areas 115, 117 and 119 provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

Figure 1:
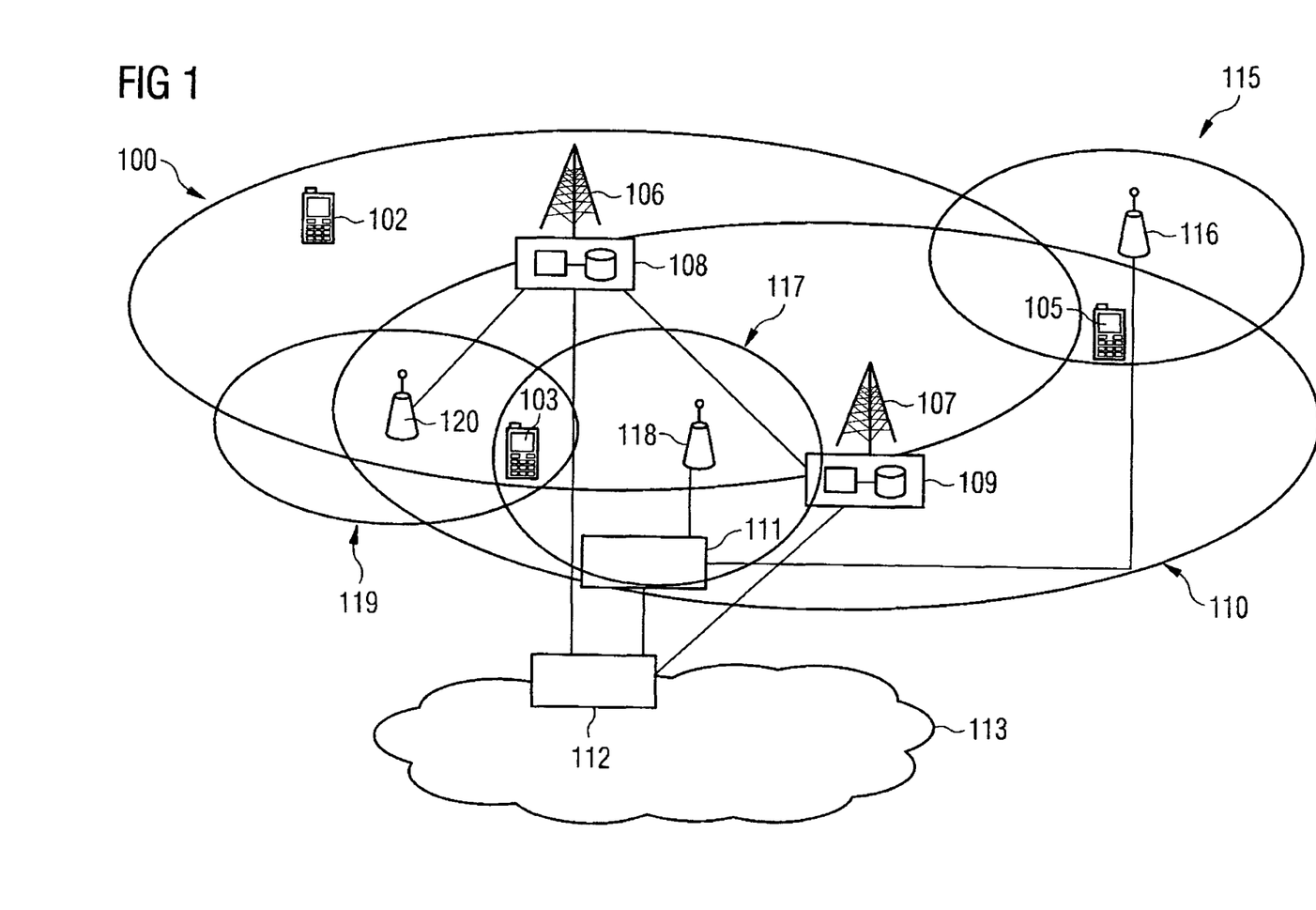
FIG. 1 shows a schematic diagram of a network according to some embodiments.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units.

In FIG. 1 stations 106 and 107 are shown as connected to a wider communications network 113 via gateway 112. A further gateway function may be provided to connect to another network. The smaller stations 116, 118 and 120 can also be connected to the network 113, for example by a separate gateway function and/or via the controllers of the macro level stations. In the example, stations 116 and 118 are connected via a gateway 111 whilst station 120 connects via the controller apparatus 108.

Figure 2:
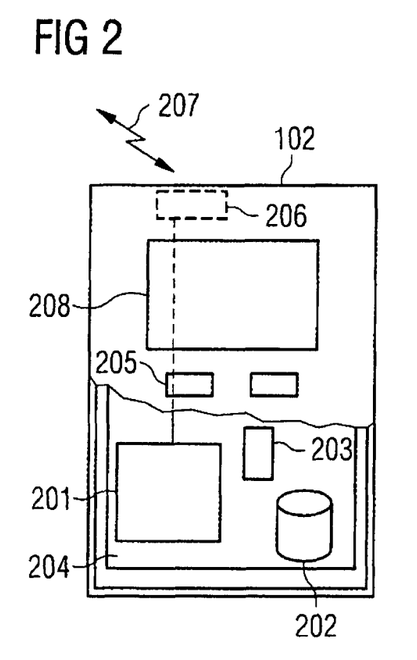
FIG. 2 shows a schematic diagram of a mobile communication device according to some embodiments.

A possible mobile communication device for transmitting and retransmitting information blocks towards the stations of the system will now be described in more detail in reference to FIG. 2 showing a schematic, partially sectioned view of a communication device 102. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information. The mobile device 102 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with Tx antenna numbers or port numbers of MIMO arrangements. Further, the antennas which are served by an e-NodeB can potentially be located at different physically separated positions.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
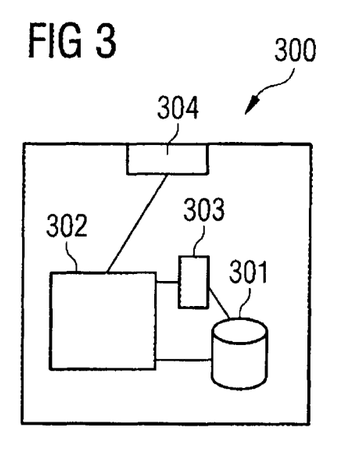
FIG. 3 shows a schematic diagram of a control apparatus according to some embodiments.

FIG. 3 shows an example of a control apparatus for a communication system, for example to be coupled to and/or for controlling a station of an access system, such as a base station. In some embodiments base stations comprise a separate control apparatus. In other embodiments the control apparatus can be another network element. The control apparatus 109 can be arranged to provide control on communications in the service area of the system. The control apparatus 109 can be configured to provide control functions in association with generation and communication of request and instructions in view of reception of information blocks, retransmissions and other related information by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions. It shall be appreciated that similar component can be provided in a control apparatus provided elsewhere in the system for controlling reception of sufficient information for decoding of received information blocks.

The communication devices 102, 103, 105 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate LTE access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved or enhanced Node-Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

Figure 4:
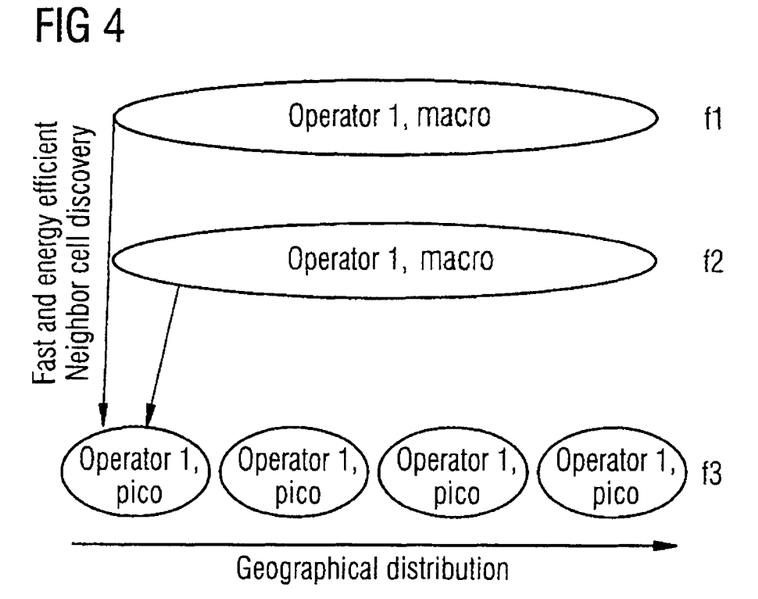
FIG. 4 schematically shows an arrangement with two macro cells and four pico cells.

Reference is made to FIG. 4. In a macro cell of the operator, two different carrier frequencies F1 and F2 are used. Overlying the macro cell are, in this example, four pico cells. Each of the pico cells is operated by the same operator as the macro cell and the pico cells operate on a third, different frequency F3.

It has been proposed to allow a new carrier at 3.5 GHz to be used. This carrier may be used for, for example, the pico cells of FIG. 4. It should be appreciated that in other embodiments, other frequencies may be used in the pico cells. In some embodiments, all of the pico cells may use a common frequency. In alternative embodiments, one or more of the pico cells in the coverage area of a particular macro cell may use one or more different frequencies.

In some embodiments, inter-site carrier aggregation may be used where two or more macro carriers 'point' to the same offloading carrier (one of the pico cells) to improve mobility and deployment. Thus, in the arrangement shown in FIG. 4, two or more carriers from the same operator may target the same carrier F3 for inter-site carrier aggregation. The user equipment may move from the macro cell to the small cell in certain scenarios.

It should be appreciated that alternative embodiments may be used in other scenarios. Some embodiments may be used where fast cell discovery is required.

For small cells in a dedicated carrier, inter-frequency measurements may be required. In networks where the macro cells provide good coverage (for example, there is a high minimum level of signal to interference and noise ratio SINR), the user equipment does not continuously scan for small cells in another carrier. This is to save power. Inter-frequency measurements may be time consuming and power consuming. Inter-frequency measurements may require measurement gaps where the service continuity is broken.

A network may configure user equipment to have aggressive scanning. However, this may lead to higher power consumption for all terminals and this may mean that the small cell coverage may have to be relatively high in order for user equipment not waste power the majority of time.

By way of example, if the 3.5 GHz is deployed for indoor small cells with a low geographic coverage and potentially in a shared band, it may be that this small cell layer may not have a high coverage compared to a single macro cell coverage zone.

In some embodiments, a pilot or reference signal configuration is provided in the small cell layer which may be adapted to the timing of one or more hosting macro carriers or cells. In some embodiments, by establishing a preconfigured time relationship between the carriers in the macro cell and the carrier in the small cell, a relatively large energy consumption saving may be possible. If there is a preconfigured time relationship, the user equipment may only need to search within a limited time window in order to look for a potential offloading candidate. In other words, the user equipment is searching for a small site or cell within a limited time window.

In some embodiments, a time wise coupling or synchronisation may be established between for example a macro cell and one or more small cells. This is to increase the speed of small cell discovery for handover. Alternatively or additionally, this time wise coupling or synchronisation may be used for inter site carrier aggregation.

In some embodiments, two or more macro cells may be present. Each macro cell has a different frequency. The macro cells may be deployed asynchronously. Accordingly, in some embodiments, the small cell layer may potentially support two or more pilot signal placements to create an initial coupling between the respective macro cells and the small cell set.

In some embodiments, the pilot or reference signals may be embedded within the user payload data.

The pilot synchronisation may be achieved by any suitable method. For example, one or more of the following methods may be used:

'over-the-air' pilot synchronisation may be used. With this method, the small cell base station has a network listen mode (NLM) capability in the relevant frequency band or bands of the one or more of the associated macro sells. For example, if the small cell is associated with the first and second macro cells operating at frequencies F1 and F2 respectively, the small cell base station will have the network listening mode capability in frequencies F1 and F2, even if the small cell is operating at a different frequency F3;

Transport-based synchronisation may be agreed between the two or more macro base stations that can be operating in different frequency layers;

external synchronisation measures may be used. By way of example, this may be provided by GPS (global positioning system).

It should be appreciated that any other suitable method can alternatively or additionally be used for synchronisation.

In some embodiments, the pilot or reference signal may be designed to allow for relatively fast detection by the user equipment. Accordingly in some embodiments, a user equipment camping on a hosting macro cell will know within a few OFDM (orthogonal frequency division multiplexing) symbols accuracy where the pilot or reference signal of the small cell begins. In other embodiments the transmission of the pilot or reference signal may be defined to occur within a limited time interval, but otherwise not coupled to the transmission technology. This may be defined relative to the existing macro cell synchronisation. This may define a search window which the user equipment will use for the inter-frequency measurements. In other words, the user equipment which is camped on the macro cell at one frequency will perform frequency measurements or other radio resource management related measurements on the small cell.

Alternatively or additionally, the pilot signal may be of a relatively short time duration allowing for synchronisation to one or more macro host carriers that may be asynchronously operating as handover or inter site carrier aggregation candidates.

Alternatively or additionally, the pilot signature or reference signal may be scrambled or coupled to for example the operator ID (identity) by any other suitable method, to allow for potential band sharing of a dedicated small cell band. In other words, the band for the small cells is shared by two or more operators.

Alternatively or additionally, the pilot signal can take any suitable form. For example, in some embodiments, the pilot signal would indicate the presence of the small cell on a particular carrier. This would trigger a full cell establishment procedure where a search for a synchronisation channel and broadcast signals would then be carried out. Alternatively, the pilot or reference signal may also provide information on, for example cell timing.

Figure 5:
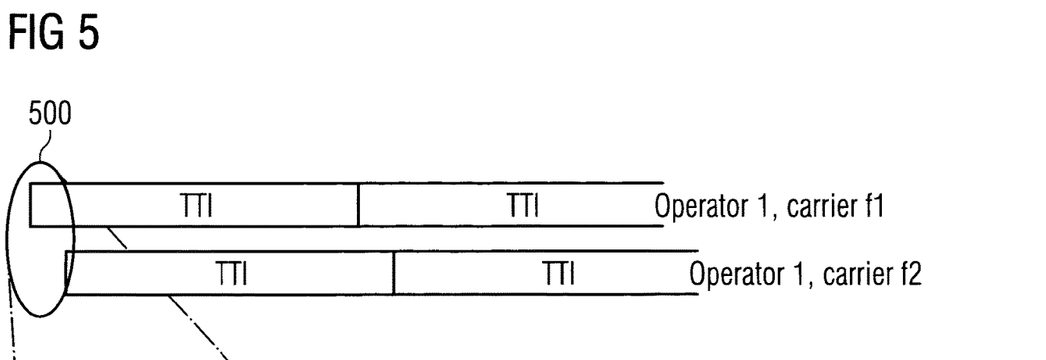
FIG. 5 shows schematically a time offset between the first and second macro cells of FIG. 4.
Figure 6:
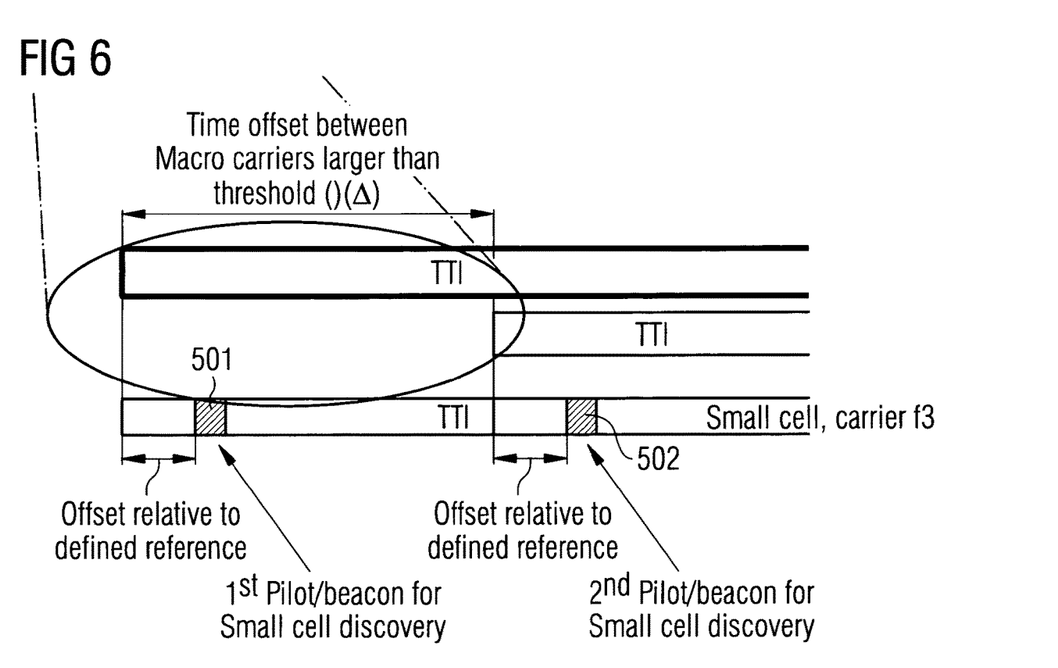
FIG. 6 shows a scenario where the time offset between the macro cells of FIG. 4 is greater than a threshold.
Figure 7:
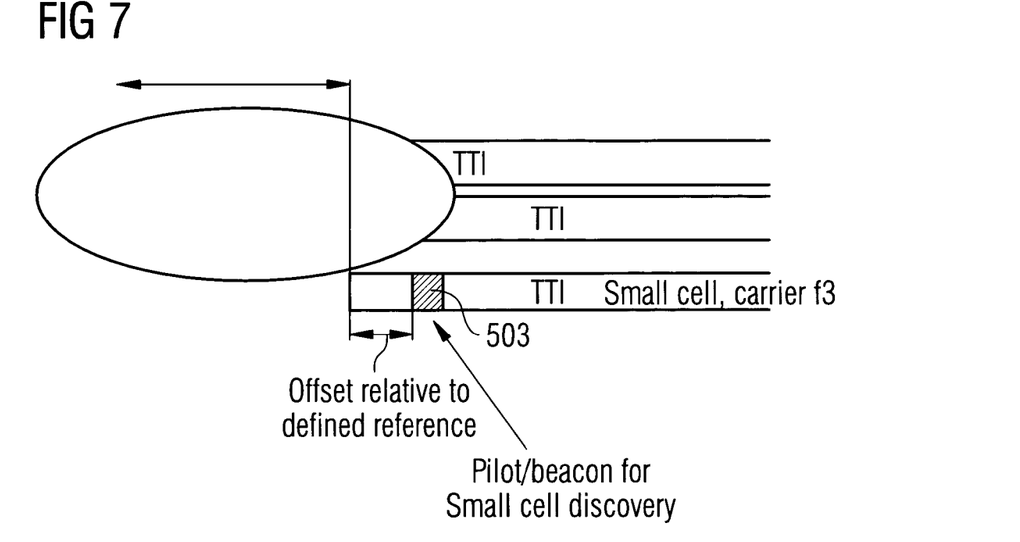
FIG. 7 shows a scenario where the time offset between the macro cells of FIG. 4 is less than or equal to the threshold.

Reference is now made to FIG. 5 which shows one example of a reference/pilot signal used. As schematically shown, two macro cells are provided. Each of the macro cells may be handled by the same operator, which is used as a non-limiting example, as multiple operators could be serving the different macro cells. One of the cells is operated at a frequency of F1 and the other macro cell is operated at a frequency of F2. The two cells are operated asynchronously. As can be seen in the first part of FIG. 5, there is a time offset between the two macro cells. As will be described in more detail later, FIG. 6 shows an example where the time offset between the macro cell carriers is greater than a threshold. FIG. 7 shows the situation where the time offset between the macro carriers is less than or equal to a threshold.

Referring first to FIG. 6, there is a relatively large separation between the two carrier signals starting points defined for the TTI (transmission time interval) or radio frame start. This time offset is greater than a system configured monitoring window A which a user equipment would be expected to handle. The expected time window may be relatively small in order to allow for a relatively fast and/or efficient search across the carrier. The monitoring window can be set as required. For example, in some embodiments, the duration of the monitoring window may be set to be between one to 6 OFDM symbols, or simply limited to a given time duration. This may be dependent on the required physical resources that would need to be assigned to the operation. For example, in some embodiments, time could be traded for frequency. This may mean that fewer frequency domain resources may be assigned to the pilot or reference signal. This would result in the pilot or reference signal having a longer duration. However, the resources may be selected in dependence on the system requirements.

In the arrangement shown in FIG. 6, there is a relatively large time offset between the first and second macro cell carriers. In order to facilitate a fast search procedure, the small cell transmits a first pilot/reference signal and a second pilot/reference signal. The first pilot is referenced 501 and the second pilot is referenced 502. The first pilot 501 would be used if the user equipment were on the first carrier F1 whilst the second pilot 502 would be used if the user equipment is on the second macro cell on the second frequency F2. As can be seen, the first pilot signal is transmitted with an offset with respect to the starting point of the TTI or radio frame part of the first macro cell. Likewise, the second pilot signal is transmitted with the same offset but with respect to the starting point of the TTI or radio frame start of the second macro cell.

In some embodiments the window size may be used when defining the potential offsets which are to be used. When the relative macro offsets are close to each other, the timing setting will attract the pilots and use either a clustering or a common pilot as described below. When the relative macro offsets are a bit more offset, the pilots will have a forced separation.

In some embodiments, the offset of the first pilot signal may be different to the off-set of the second pilot signal.

In some embodiments, a time range may be set in which the pilot signal is to be transmitted and the base station of the small cell will schedule that pilot within that time range. That time range may be defined with respect to for example the starting point defined for the TTI or radio frame start of the respective macro cell.

In other embodiments the timing of the pilot signal may be defined with respect to a different reference, other than the starting point for the TTI or the radio frame start time.

Reference is made to FIG. 7. In this example, the offset between the macro carrier cells is less than or equal to the threshold Δ. (It should be appreciated that FIGS. 6 and 7 are not drawn to scale) If the time offset between the macro carriers is less than or equal to the threshold, then it is not necessary for the small cell to provide a pilot or reference signal separately for each of the macro cells. Instead, as shown in FIG. 7, a pilot or reference signal can be used by both the first and second cells. This may reduce the general overhead for serving two or more macro cells as well as dealing with potential collisions occurring where the macro cells have a relatively small time separation.

In the arrangement shown in FIG. 7, the offset may be defined with respect to the start of the TTI of one of the macro cells. Generally, this will be the macro cell which is the later of the two macro cells. However, in alternative embodiments, a different selection may be made. The offset may be as described with reference to FIG. 6.

Figure 8:
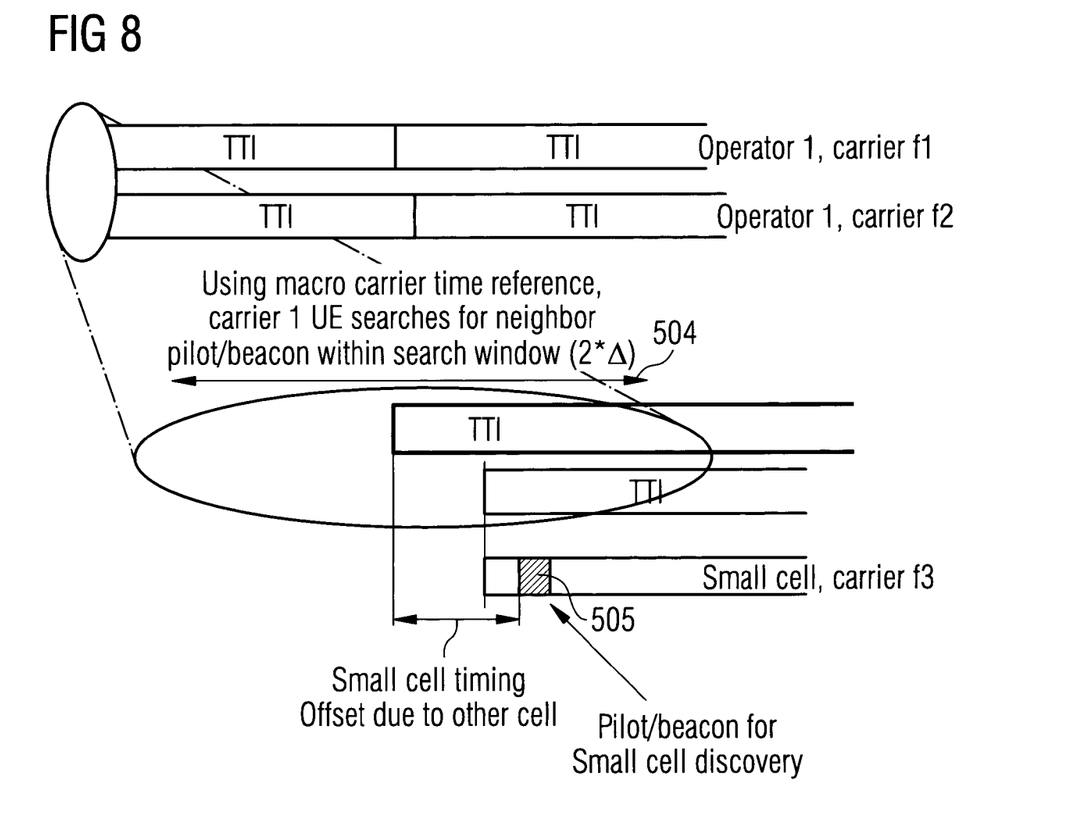
FIG. 8 shows schematically the searching by the user equipment for the reference signal of a pico cell.

Reference is now made to FIG. 8 which describes the searching. In the example shown in FIG. 8, a user equipment which is connected to the macro cell using carrier frequency F1 is searching for the small cell carrier frequency F3. The user equipment may search for a pilot of reference signal at time differences+/−Δ relative to its own macro timing. In this example, the searching window used by the user equipment will be 2*Δ. Accordingly, in some embodiments, the pilot signal assignment for a small cell should be such that there is only one pilot or reference signal with in each window 2*Δ.

In FIG. 8, the window is referenced 504. The pilot signal is referenced 505 and is within the search window. In this example, a single reference signal is used for both of the macro cells due to the time offset between the macro carriers being less than or equal to the threshold Δ. It is of course possible that there will be two reference or pilot signals, as shown in FIG. 6. However, the reference signals for the different macro cells will not fall within the same search window.

In some embodiments, the pilots signal may be embedded into the normal transmitted signals of the small cell. In some embodiments, the normal small cell transmission of user data may include indication of the transmission of the pilot signals, such that the data channel user transmissions do not collide with the pilot transmission, and hence the data channel performance is only marginally impacted by the small cell pilot transmission. In other exemplary embodiments, the small cell pilot transmission could happen using brute force, meaning that the data channel data transmission symbols will be substituted by the pilot signal, resulting in the data channel performance being significantly reduced.

Figure 9:
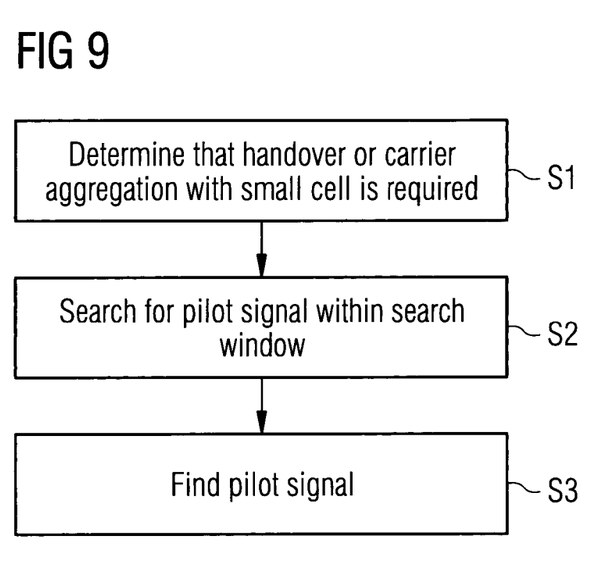
FIG. 9 shows a method of an embodiment.

In some embodiments, faster handover measurements and/or carrier aggregation between two or more macro carriers and a given small cell carrier may be achieved. In some embodiments, a user equipment may distinguish an 'own-operator' small cell base station from that of another non-accessible operator. In some embodiments, this may be useful when a user equipment has lists or preferred or blocked operators. In situations where an operator ID is on a blocked list, the user equipment may be configured such that it does not try to access the small cell, as it would not be allowed access. Reference is now made to FIG. 9 which shows a method according to an embodiment.

In step S1, the user equipment determines or is informed by its base station that handover or carrier aggregation with a smaller cell is required. The base station will provide information on the frequency to be searched, F3 in this example.

In step S2, the user equipment will search for the pilot signal of the small cell within the search window.

In step S3, the user equipment finds the pilot signal of the small cell. From this, the user equipment is able to take the necessary steps in order to achieve carrier aggregation or handover to the small cell.

One or more of the steps of the FIG. 9 may be performed by at least one processor and at least one memory of the user equipment. This may be in conjunction with suitable computer program, computer executable instructions or computer code.

As discussed above, a small cell may be a pico or micro-cells or other "small cells". It should be noted that alternatively or additionally embodiments may be used with any size of cell.

In some embodiments, one or more cells of a first general size may be provided and one or more cells of a second general size may be provided. One or more of the cells or the second general size may overlay one or more cells of the first general size. The one or more cells of the second general size may use a same frequency. The one or more cells of the first general size may use different frequencies.

Reference has been made to pilot or reference signals. It should be appreciated that alternatively or additionally any other suitable signal may be used. Any signal which is required in order to allow a cell to be found may be used. Any such signal may be referred to a reference signal in this document.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method, said method being performed by a user equipment in a communications network comprising a first cell operating on a first frequency, a second cell operating on a second frequency, and a third cell operating on a third frequency, the first and second cells being macro cells, and the third cell being a small cell overlying the first cell and the second cell, the user equipment being in the first cell operating on the first frequency, said method comprising:
    determining whether a handover to or carrier aggregation with the third cell is required;
    searching for a reference signal of said third cell within a time window defined with respect to a first frequency signal of said first cell or a second frequency signal of the second cell,
        wherein, when a time offset between the first cell and the second cell is greater than a threshold, the reference signal comprises pilots defined with a time offset with respect to the first cell and separate pilots defined with the same time offset with respect to the second cell, and
        wherein, when a time offset between the first cell and the second cell is smaller than or equal to the threshold, the reference signal comprises common pilots defined with a time offset with respect to the first cell;
    finding the reference signal; and
    using the reference signal to initiate handover to or carrier aggregation with said third cell.

2. The method as claimed in claim 1, wherein the threshold is equal to half of the time window.

3. The method as claimed in claim 1,
    wherein, when the time offset between said first cell and said second cell is greater than the threshold, the reference signal comprises pilots defined with a time offset with respect to a starting point of a transmission time interval or radio frame of the first cell and separate pilots defined with the same time offset with respect to the second cell; and
    wherein, when a time offset between said first cell and said second cell is smaller than or equal to the threshold, the reference signal comprises pilots defined with a time offset with respect to a starting point of a transmission time interval or radio frame of the first cell.

4. The method as claimed in claim 1, wherein said third cell is smaller in coverage area than said first cell and said second cell.

5. The method as claimed in claim 1, wherein said third cell is one of a plurality of third cells overlying said first cell and said second cell.

6. A computer program product comprising a non-transitory computer readable medium having a program of instructions encoded thereon, wherein the program of instructions cause a computer system to be configured to perform the method of claim 1 when the program of instructions is run on the computer system.

7. The method as claimed in claim 1, wherein said reference signal comprises information to permit an attachment of said user equipment to said third cell.

8. The method as claimed in claim 7, wherein said reference signal is coupled to identity information associated with an operator.

9. An apparatus, said apparatus being a user equipment in a communications network comprising a first cell operating on a first frequency, a second cell operating on a second frequency, and a third cell operating on a third frequency, the first and second cells being macro cells, and the third cell being a small cell overlying the first cell and the second cell, the user equipment being in the first cell operating on the first frequency, said apparatus comprising:
    at least one processor; and
    at least one memory including computer program code, the at least one memory and the computer code configured, with the at least one processor, to cause the
apparatus at least to perform:
determine whether a handover to or carrier aggregation
with the third cell is required;
search for a reference signal of said third cell within a
time window defined with respect to a first frequency
signal of said first cell or a second frequency signal of
the second cell,
wherein, when a time offset between the first cell and
the second cell is greater than a threshold, the
reference signal comprises pilots defined with a time
offset with respect to the first cell and separate pilots
defined with the same time offset with respect to the
second cell, and
wherein, when a time offset between the first cell and
the second cell is smaller than or equal to the
threshold, the reference signal comprises common
pilots defined with a time offset with respect to the
first cell;
find the reference signal; and
use the reference signal to initiate handover to or carrier
aggregation with said third cell.

10. The apparatus as claimed in claim 9, wherein the threshold is equal to half of the time window.

11. The apparatus claimed in claim 9,
wherein, when the time offset between said first cell and said second cell is greater than the threshold, the reference signal comprises pilots defined with a time offset with respect to a starting point of a transmission time interval or radio frame of the first cell and separate pilots defined with the same time offset with respect to the second cell; and
wherein, when a time offset between said first cell and said second cell is smaller than or equal to the threshold, the reference signal comprises pilots defined with a time offset with respect to a starting point of a transmission time interval or radio frame of the first cell.

12. The apparatus as claimed in claim 9, wherein said third cell is smaller in coverage area than said first cell and said second cell.

13. The apparatus as claimed in claim 9, wherein said third cell is one of a plurality of third cells overlying said first cell and said second cell.

14. The apparatus as claimed in claim 9, wherein said reference signal comprises information to permit an attachment of said user equipment to said third cell.

15. The apparatus as claimed in claim 14, wherein said reference signal is coupled to identity information associated with an operator.

16. An apparatus comprising:
at least one processor; and
at least one memory including computer program code, the at least one memory and the computer code configured, with the at least one processor, to cause the apparatus at least to perform:
provide a reference signal for a user equipment in a communications network comprising a first cell operating on a first frequency, a second cell operating on a second frequency, and a third cell operating on a third frequency, the first and second cells being macro cells, and the third cell being a small cell overlying the first cell and the second cell, the user equipment being in the first cell operating on the first frequency in the first cell, to use to handover to or perform carrier aggregation with the third cell, said reference signal being provided within the third cell within a time window defined with respect to a first frequency signal of said first cell or the second frequency signal of the second cell,
wherein, when a time offset between the first cell and the second cell is greater than a threshold, the reference signal comprises pilots defined with a time offset with respect to the first cell and separate pilots defined with the same time offset with respect to the second cell, and
wherein, when a time offset between the first cell and the second cell is smaller than or equal to the threshold, the reference signal comprises common pilots defined with a time offset with respect to the first cell; and
permitting said user equipment to initiate handover to or carrier aggregation with said third cell.

* * * * *